US012664793B2

(12) United States Patent　　　　　(10) Patent No.:　US 12,664,793 B2
Månsson et al.　　　　　　　　　　　　(45) Date of Patent:　　Jun. 23, 2026

(54) METHOD FOR GENERATING SYNTHETIC TRAFFIC SIGN DATA

(71) Applicant: ZENSEACT AB, Gothenburg (SE)

(72) Inventors: Olle Månsson, Gothenburg (SE);
Willem Verbeke, Gothenburg (SE)

(73) Assignee: ZENSEACT AB, Gothenburg (SE)

( * ) Notice: Subject to any disclaimer, the term of this
patent is extended or adjusted under 35
U.S.C. 154(b) by 120 days.

(21) Appl. No.: 18/658,197

(22) Filed: May 8, 2024

(65) Prior Publication Data

US 2024/0378897 A1　　Nov. 14, 2024

(30) Foreign Application Priority Data

May 9, 2023　(EP) ..................................... 23172196

(51) Int. Cl.
*G06V 20/58*　　(2022.01)
*G06T 7/70*　　(2017.01)
*G06T 17/00*　　(2006.01)
*G06V 10/764*　(2022.01)
*G06V 20/54*　　(2022.01)
*G06V 20/70*　　(2022.01)

(52) U.S. Cl.
CPC .............. *G06V 20/582* (2022.01); *G06T 7/70*
(2017.01); *G06T 17/00* (2013.01); *G06V*
*10/764* (2022.01); *G06V 20/54* (2022.01);
*G06V 20/70* (2022.01); *G06V 2201/07*
(2022.01)

(58) Field of Classification Search
None
See application file for complete search history.

(56) References Cited

U.S. PATENT DOCUMENTS

2018/0285663 A1* 10/2018 Viswanathan ......... G06V 20/63
2020/0184027 A1*　6/2020 Dolan ................... G01S 7/4052
2021/0004017 A1　　1/2021 Colgate et al.

OTHER PUBLICATIONS

Hanel, Alexander et al.; "Evaluation of a Traffic Sign Detector by
Synthetic Image Data for Advanced Driver Assistance Systems";
The International Archives of the Photogrammetry, Remote Sensing
and Spatial Information Services, vol. XLII-2; Jun. 7, 2018;
XP093088183; pp. 425-432 (8 pages).
Bjørnstrup, Jørgen; "Making 3D Models of Real World Objects";
Virtual Space, Jan. 1, 2002; XP093088225; pp. 93-94, (2 pages).

(Continued)

*Primary Examiner* — James M Anderson, II
(74) *Attorney, Agent, or Firm* — Sage Patent Group

(57)　　　　　　　　ABSTRACT

The present invention is related to a computer-implemented
method for generating synthetic traffic sign data for training
a traffic sign detection model. The method includes: extract-
ing, from a sample image depicting a surrounding environ-
ment of a vehicle including a detected traffic sign, a face of
the detected traffic sign, using information indicative of an
orientation of the detected traffic sign; forming a 3D model
of the traffic sign having the extracted face of the detected
traffic sign; and generating synthetic traffic sign data by
placing the 3D model of the traffic sign in one or more
background images, wherein the 3D model is placed in the
one or more background images based on a distribution of
a placement of real-world traffic signs in a dataset of
real-world images.

15 Claims, 5 Drawing Sheets

(56)  References Cited

OTHER PUBLICATIONS

Chigorin, Alexander et al.; "A System for Large-Scale Automatic Traffic Sign Recognition and Mapping"; ISPRS Annuls of the Photogrammetry, Remote Sensing and Spatial Information Services, vol. II-3/W3, 2013 CMRT 13—City Models, Roads and Traffic 2013; Nov. 12-13, 2013; pp. 13-17 (5 pages).
Shakhuro, Vlad et al.; "Rare Traffic Sign Recognition using Synthetic Training Data"; Association for Computing Machinery; ICVIP 2019; Dec. 20-23, 2019; pp. 23-26 (4 pages).
Extended European Search Report mailed Oct. 13, 2023 for European Patent Application No. 23172196.0, 9 pages.

* cited by examiner

200

| |
|---|
| S202<br>Obtaining a training data set |

| |
|---|
| S204<br>Training the traffic sign detection model on the obtained training data set |

300

Control Circuitry
302

Processor
304

Transceiver
306

Memory
308

Capturing function
310

Detecting function
312

Extracting function
314

Forming function
316

Generating function
318

Obtaining function
320

Assigning function
322

Transmitting function
324

Updating function
326

METHOD FOR GENERATING SYNTHETIC TRAFFIC SIGN DATA

CROSS-REFERENCE TO RELATED APPLICATIONS

The present application for patent claims priority to European Patent Office Application Ser. No. 23172196.0, entitled "A METHOD FOR GENERATING SYNTHETIC TRAFFIC SIGN DATA" filed on May 9, 2023, assigned to the assignee hereof, and expressly incorporated herein by reference.

TECHNICAL FIELD

The present inventive concept relates to the field of autonomous vehicles. In particular, it is related to methods and devices for generating synthetic traffic sign data, and for training a traffic sign detection model using the generated synthetic traffic sign data.

BACKGROUND

With the development of technology in recent years, image capturing and processing techniques have become widely used in different fields of technology. In particular, vehicles produced today are commonly equipped with some form of vision or perception system for enabling new functionalities.

An increasing portion of modern vehicles have advanced driver-assistance systems (ADAS) to increase vehicle safety and more generally road safety. ADAS-which for instance may be represented by adaptive cruise control (ACC), collision avoidance system, forward collision warning, lane support systems, etc.—are electronic systems that may aid a driver of the vehicle. Today, there is ongoing research and development within a number of technical areas associated to both the ADAS and the Autonomous Driving (AD) field. ADAS and AD may also be referred to under the common term Automated Driving System (ADS) corresponding to all of the different levels of automation as for example defined by the SAE J3016 levels (0-5) of driving automation.

An important task of ADAS and AD systems is traffic sign recognition, which today is commonly done by detection in images and classification based on trained machine learning models. One of the key challenges in developing a system for traffic sign recognition is the collection of a large and representative datasets of images of traffic signs.

With the machine learning algorithms available today, one can be relatively confident that one can achieve good performance in classifying traffic signs for those signs that have good support in the dataset. However, the same cannot be said for rare traffic sign classes or for regional/country specific variations of common classes where little or no data is available.

For some of these traffic signs classes, the real-world scarcity of the traffic sign makes it hard and extremely expensive to collect and annotate enough samples. In addition, regional/country specific variations, and emerging privacy or data protection laws make further data collection hard or even impossible.

A solution to this problem is synthetic data generation which can be used to effectively increase the support for rare and/or important traffic sign classes. Synthetic data generation refers to the process of creating new data that is similar in structure and format to the original dataset but is not based on real-world observations. With that said, synthetic data generation is in itself a challenging research area. When generating synthetic traffic sign data, the images must be realistic enough so that a neural network trained on them will be fully operational and adequate in all real world circumstances that might occur. Generating synthetic data that satisfies this need is a challenge. There is therefore need for improved solutions for generating synthetic traffic sign data.

SUMMARY

The herein disclosed technology seeks to mitigate, alleviate or eliminate one or more of the above-identified deficiencies and disadvantages in the prior art to address various problems relating to generation of synthetic traffic sign data in development of autonomous or semi-autonomous vehicles.

The inventors have realized a new and improved way of generating realistic synthetic data of traffic signs in a more easy and effective way.

Various aspects and embodiments of the disclosed invention are defined below and in the accompanying independent and dependent claims.

According to a first aspect of the presently disclosed technology, there is provided a computer-implemented method for generating synthetic traffic sign data for training a traffic sign detection model. The method comprises extracting, from a sample image depicting a surrounding environment of a vehicle comprising a detected traffic sign, a face of the detected traffic sign, using information indicative of an orientation of the detected traffic sign. The method further comprises forming a 3D model of the traffic sign having the extracted face of the detected traffic sign. The method further comprises generating synthetic traffic sign data by placing the 3D model of the traffic sign in one or more background images. The 3D model is placed in the one or more background images based on a distribution of a placement of real-world traffic signs in a dataset of real-world images.

A possible associated advantage of the presently disclosed technology it that it provides for an accurate 3D model which gives full control of the placement of the detected traffic sign to generate the synthetic data. Further, as opposed to simply placing 2D models of the traffic sign in background images, the use of a 3D model may provide for the effect of yielding more realistic synthetic data. The presently disclosed technology further makes it more feasible to implement a 3D-approach, as it may alleviate what could otherwise be a problem in time and resource requirement complexity.

The present technology further provides for an improved way of placing the 3D model in the background images, which results in more realistic data. In particular, by utilizing the distribution of placement of traffic signs in a dataset of real-world images of traffic signs, it is possible to generate more synthetic data in an automated and more effective way, while at the same time achieving an increased realism in placement of the 3D model compared to prior art. This, in turn, may have the effect of yielding a traffic sign detection model which learns to recognize and generalize patterns that are more relevant to the problem being solved. The model also becomes more robust to variations and noise that may be present in the real-world data. This results in improved accuracy and better performance of the model when applied to new, unseen data. It may further help to reduce bias in the model. Overall, using realistic and representative training data is essential for developing machine learning models that perform well in the real world.

In addition, some embodiments enable the synthetic traffic sign data generation to be performed continuously as a vehicle travels on the road in an efficient way, thereby reducing the time it takes to generate sufficient data to develop a traffic sign detection model with desirable performance.

According to a second aspect, there is provided a computer program product comprising instructions, which, when the program is executed by a computing device, causes the computing device to carry out the method according to any embodiment of the first aspect. According to an alternative embodiment of the second aspect, there is provided a (non-transitory) computer-readable storage medium. The non-transitory computer-readable storage medium stores one or more programs configured to be executed by one or more processors of a processing system, the one or more programs comprising instructions for performing the method according to any embodiment of the first aspect. The above-mentioned features of the first aspect, when applicable, apply to this second aspect as well. In order to avoid undue repetition, reference is made to the above.

According to a third aspect, there is provided a method for training a traffic sign detection model. The method comprises obtaining a training dataset comprising synthetic traffic sign data generated by any embodiment of the first aspect. The method further comprises training the traffic sign detection model on the obtained training dataset. The step of training the traffic sign detection model is performed in a server, or in a vehicle. The above-mentioned features of the first and second aspects, when applicable, apply to this third aspect as well. In order to avoid undue repetition, reference is made to the above.

According to a fourth aspect, there is provided a device for generating synthetic traffic sign data for training a traffic sign detection model. The device comprises control circuitry. The control circuitry is configured to extract, from a sample image depicting a surrounding environment of a vehicle comprising a detected traffic sign, a face of the detected traffic sign, using information indicative of an orientation of the detected traffic sign. The control circuitry is further configured to form a 3D model of the traffic sign having the extracted face of the detected traffic sign. The control circuitry is further configured to generate synthetic traffic sign data by placing the 3D model of the traffic sign in one or more background images. The 3D model is placed in the one or more background images based on a distribution of a placement of real-world signs in a dataset of real-world images. The above-mentioned features of the first, second and third aspects, when applicable, apply to this fourth aspect as well. In order to avoid undue repetition, reference is made to the above.

According to a fifth aspect, there is provided a vehicle. The vehicle comprises one or more sensors. The vehicle further comprises a device for generating synthetic traffic sign data for training a traffic sign detection model, according to any embodiment of the fourth aspect. The above-mentioned features of the first, second, third and fourth aspects, when applicable, apply to this fifth aspect as well. In order to avoid undue repetition, reference is made to the above.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

The disclosed aspects and preferred embodiments may be suitably combined with each other in any manner apparent to anyone of ordinary skill in the art, such that one or more features or embodiments disclosed in relation to one aspect may also be considered to be disclosed in relation to another aspect or embodiment of another aspect.

Further embodiments are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the disclosed technology will, in the following, be further clarified with reference to the embodiments described hereinafter.

BRIEF DESCRIPTION OF THE DRAWINGS

The above aspects, features and advantages of the disclosed technology, will be more fully appreciated by reference to the following illustrative and non-limiting detailed description of example embodiments of the present disclosure, when taken in conjunction with the accompanying drawings, in which.

DETAILED DESCRIPTION

Figure 1:
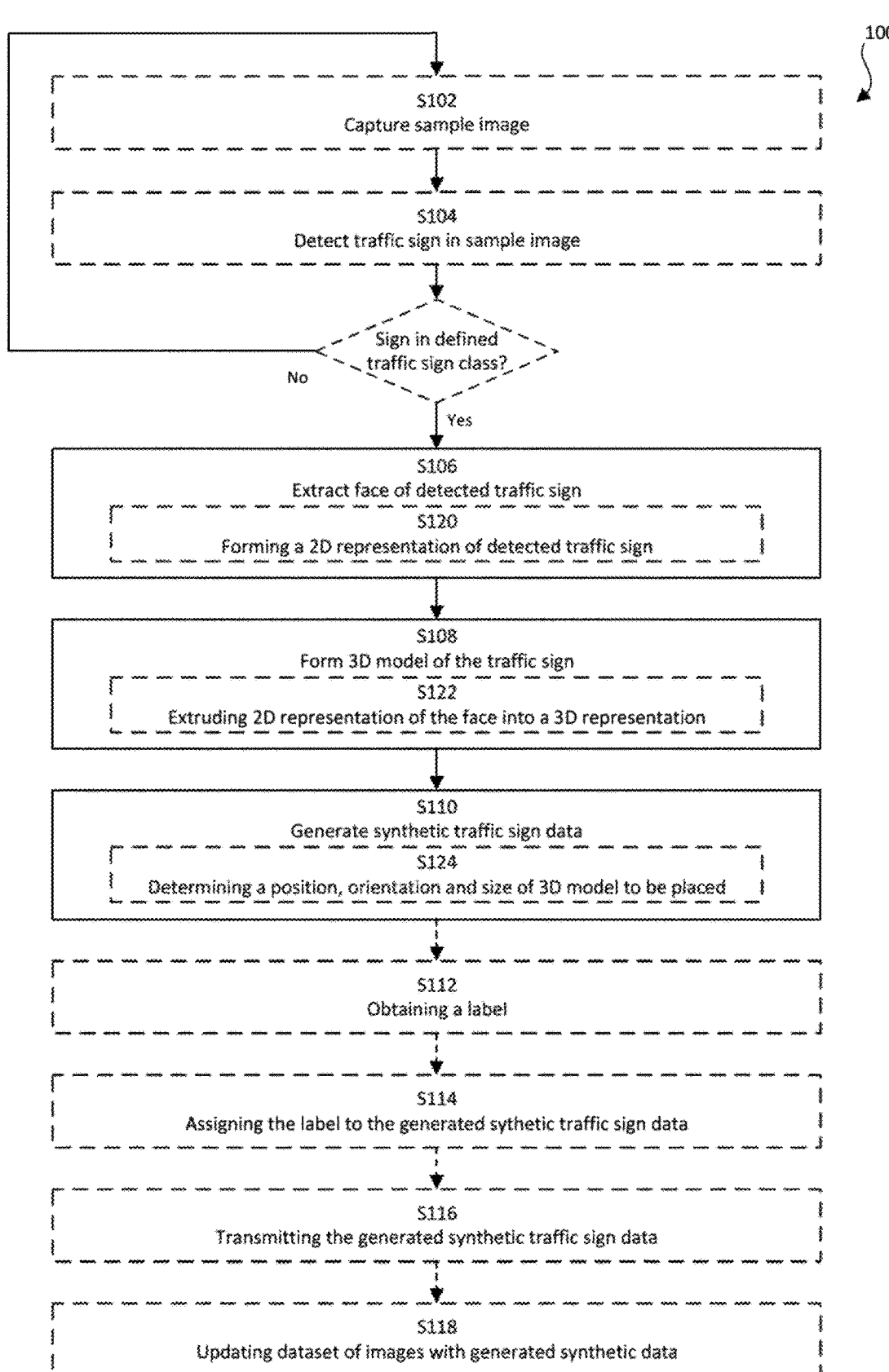
FIG. 1 is a schematic flowchart representation of a method for generating synthetic traffic sign data for training a traffic sign detection model in accordance with some embodiments.

The present disclosure will now be described in detail with reference to the accompanying drawings, in which some example embodiments of the disclosed technology are shown. The disclosed technology may, however, be embodied in other forms and should not be construed as limited to the disclosed example embodiments. The disclosed example embodiments are provided to fully convey the scope of the disclosed technology to the skilled person. Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs), using one or more Field Programmable Gate Arrays (FPGA) and/or using one or more Digital Signal Processors (DSPs).

It will also be appreciated that when the present disclosure is described in terms of a method, it may also be embodied in apparatus comprising one or more processors, one or more memories coupled to the one or more processors, where computer code is loaded to implement the method. For example, the one or more memories may store one or more computer programs that causes the apparatus to perform the steps, services and functions disclosed herein when executed by the one or more processors in some embodiments.

It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context clearly dictates otherwise. Thus, for example, reference to "a unit" or "the unit" may refer to more than one unit in some contexts, and the like. Furthermore, the words "comprising", "including", "containing" do not exclude other elements or steps. It should be emphasized that the term "comprises/comprising" when used in this specification is taken to specify the presence of stated features, integers, steps, or components. It does not preclude the presence or addition of one or more other features, integers, steps, components, or groups thereof. The term "and/or" is to be interpreted as meaning "both" as well and each as an alternative.

It will also be understood that, although the term first, second, etc. may be used herein to describe various elements or features, these elements should not be limited by these terms. These terms are only used to distinguish one element from another. For example, a first element could be termed a second element, and, similarly, a second element could be termed a first element, without departing from the scope of the embodiments. The first element and the second element are both elements, but they are not the same element.

Some aspects of the presently disclosed technology provide for a way of generating synthetic traffic sign data for use in training of a traffic sign detection model. The term "synthetic data", as known within the field of machine learning, refers to artificially generated data that is created, e.g., by algorithms or models, rather than being collected from the real world. Synthetic data (in this case synthetic images) is, in the context of the present disclosure, a combination of a real-world image (e.g., as background), and one or more synthetic objects (e.g., computer generated objects or objects extracted from another source) that are added to the real-world image. In other words, the synthetic image can be seen as a composite or augmented image where the synthetic object is superimposed or placed in a background image. Synthetic data is often used when there is a lack of sufficient training data available or when collecting the data is too expensive, too sensitive (e.g., due to privacy concerns), or too difficult to collect. By generating synthetic data, machine learning models can be trained on a larger and more diverse dataset, which can improve their accuracy and generalization capabilities. In the presently disclosed technology, these principles are applied to the field of autonomous or semi-autonomous vehicle development. More specifically, for use in training of a traffic sign detection model configured to detect and/or classify traffic signs in a surrounding environment of a vehicle. Thus, the wording "synthetic traffic sign data" is to be understood as synthetic data of images comprising a traffic sign.

The generation of synthetic traffic sign data as described herein is based on the concept of generating an improved 3D model of a traffic sign which provides full geometric control over the model. The 3D model is formed based on the assumption that the surface of the traffic sign is substantially flat, compared to most other object in the surrounding environment of the vehicle. This facilitates a simple and effective way of forming the 3D model without the need for advanced algorithms or models, since the flatness of the sign can be utilized when identifying and extracting a sign from an image.

After forming the 3D model of the sign of which synthetic traffic sign data is to be generated, the present technology provides for a way of placing the traffic sign in new images or scenes in a realistic way which to a higher extent is representative of real-world scenarios than the prior art. This will be further explained in the following.

FIG. 1 is a schematic flowchart representation of a method 100 for generating synthetic traffic sign data. The synthetic traffic sign data is intended to be used in training of a traffic sign detection model. Below, the different steps are described in more detail. Even though illustrated in a specific order, the steps of the method 100 may be performed in any suitable order as well as multiple times. Thus, although FIG. 1 may show a specific order of method steps, the order of the steps may differ from what is depicted. In addition, two or more steps may be performed concurrently or with partial concurrence. For example, the steps denoted S112 and S114 may be performed at any time during the method 100, based on a specific realization. Such variation will depend on the software and hardware systems chosen and on designer choice. All such variations are within the scope of the invention. Likewise, software implementations could be accomplished with standard programming techniques with rule-based logic and other logic to accomplish the various steps. The above mentioned and described embodiments are only given as examples and should not be limiting to the present invention. Other solutions, uses, objectives, and functions within the scope of the invention as claimed in the below described patent claims should be apparent for the person skilled in the art.

The method comprises extracting S106 a face of a detected traffic sign from a sample image depicting a surrounding environment of a vehicle. The surrounding environment comprising the detected traffic sign. Extracting the face of the detected traffic sign is done based on information indicative of an orientation of the detected traffic sign.

The face of the traffic sign is to be understood as a front surface of the sign that comprises the visual information and symbols intended to convey a specific message to drivers or pedestrians. Extracting the face may in other words be understood as obtaining, isolating or segmenting the face from the rest of the sample image for further processing. Extracting S106 the face of the detected traffic sign may comprise forming S120 a 2D representation of the detected traffic sign. This may be done by projecting or transforming the detected traffic sign into 2D, based on the information indicative of the orientation. An edge-finding algorithm, segmentation model, or the like may be used on the projected traffic sign to determine the outline or shape of the traffic sign.

The wording "sample image" should within the present disclosure be construed as a real-world image of a traffic sign of which synthetic data is to be generated. Put differently, the sample image may be understood as an image of a sample of the traffic sign.

Since traffic signs are generally placed either at the side or above the road, the sample image will likely not depict the traffic sign straight on. The orientation may therefore be used to compensate for this. The orientation of the sign should be understood as an angle of the traffic sign relative a camera used to capture the image. The orientation may comprise a yaw, pitch and roll angle of the traffic sign. In other words, the orientation may comprise information about an orientation of the traffic sign in three dimensions. The information indicative of the orientation may be the orientation. Alternatively, the information indicative of the orientation may be any information from which the orientation may be determined. The information indicative of the orientation may be determined using on-board sensors of the vehicle having captured the sample image, for instance using stereo cameras. Alternatively, or in combination, additional types of sensor data (other than image data) may be used in determining the information indicative of the orientation, such as LIDAR, RADAR. A point cloud generated, e.g., by LIDAR may then be mapped to pixels of the sample image. Alternatively, the information indicative of the orientation may be determined by computer vision technologies, or by using neural networks. The information indicative of the orientation may further comprise information about intrinsic parameters of the on-board sensors used to capture the sample image. The intrinsic parameters refer to the internal characteristics relating to the sensors imaging properties. For a camera for example, the intrinsic parameters may comprise one or more of a focal length, an image sensor size, a lens distortion, a lens type, an aperture size, a shutter speed, etc. The information indicative of orientation may further comprise information about a position and orientation of the sensors used to capture the sample image, in relation to a vehicle coordinate system or the road.

It should be appreciated that the information indicative of the orientation may be determined prior to the step of extracting S106 the face of the detected traffic sign. Alternatively, the information indicative of the orientation may be determined as part of the step of extracting S106 the face.

The surrounding environment of a vehicle is to be understood as a general area around the vehicle in which objects (such as other vehicles, landmarks, obstacles, etc.) can be detected and identified by vehicle sensors (RADAR, LIDAR, cameras, etc.), i.e. within a sensor range of the vehicle.

The method 100 further comprises forming S108 a 3D model of the traffic sign having the extracted face of the detected traffic sign. The 3D model may comprise a traffic sign plate having the extracted face in three dimensions, and which can be modified in one or more ways including size and orientation. When in a subsequent step, the 3D model is placed in an image, the 3D model comprising the traffic sign plate having the extracted face may be placed on an existing traffic sign pole or gantry. Alternatively, the 3D model may further comprise a traffic sign pole or gantry. The traffic sign pole or gantry may be a pole or gantry extracted from a real-world image. Alternatively, the traffic sign pole or gantry may be computer generated.

Forming S108 the 3D model of the traffic sign may comprise extruding S122 the 2D representation of the face of the traffic sign into a 3D representation of the traffic sign. Thereby, a depth dimension can be added to the 2D representation of the face of the traffic sign to generate a shape representative of a traffic sign plate. The 3D model of the traffic sign may be generated for instance in a 3D-modelling software.

The method 100 further comprises generating S110 synthetic traffic sign data by placing the 3D model of the traffic sign in one or more background images. The 3D model is placed in the one or more background images based on a distribution of a placement of real-world signs in a dataset of real-world images. The 3D model may be placed "based on" the distribution in the sense that it is placed in a similar way as signs have been placed in the dataset of real-world images. For example, looking at the distribution, it may be determined that signs are normally placed to the right of the road, and at a certain height from the ground. Alternatively, the 3D model may be placed "based on" the distribution in the sense that it is placed in a way that compliments images already in the dataset. For example, the 3D model may be placed in a new position, e.g. to the left of the road, if the dataset comprises few or no examples of such.

By placement of a sign, it is herein meant a position (i.e., position in a ground plane and/or a height), a size, and an orientation of the sign. The placement (or more specifically the position) may be given in a three-dimensional coordinate system representing the depicted surrounding environment. Alternatively, or in combination, the placement may be given in an image reference plane. Thus, placing the 3D model of the traffic sign in the one or more background images may comprise determining S124 a position, orientation, and size of the 3D model within the one or more background images in which the 3D model is to be placed. Determining S124 the position, orientation and size of the 3D model is then be based on the distribution of the placement of real signs in the dataset of images. Thus, when placing the 3D model in the one or more image(s), the 3D model is placed in the determined position, with the determined size, and at the determined orientation. In general, the placement of the 3D model should be realistic in terms of the size of the sign (in particular of the face), the height of the sign (i.e., the distance from the face to the ground), the position of the sign (e.g. the position in relation to the road) and orientation (i.e., how the face of the sign is oriented towards the vehicle).

The 3D model of the traffic sign as placed in the one or more background images may be further adapted by changing one or more visual properties of the sign, such as wear and tear, grime, lighting condition, occlusion, etc. By varying different visual properties of the traffic sign, the traffic sign detection model trained using the generated synthetic traffic sign data may become more robust against such variations in the real-world.

The dataset of real-world images should be understood as a dataset of images depicting surrounding environments of vehicles, comprising real-world traffic signs. The dataset of images may, e.g., be a dataset used in training a traffic sign detection model. Based on this dataset of real-world images depicting traffic signs, a distribution (or probability distribution) of how the traffic signs are commonly found in the images in relation to the vehicles can be determined. Put differently, the distribution of the placement of real-world signs may state a probable position, size, and orientation of a certain sign in an image captured by a vehicle. This information is used in the placement of the 3D model in the one or more background images to thereby achieve a realistic placement of the synthetic traffic sign.

It should be appreciated that the background images need not to be part of the data set of which the distribution of the placement of traffic signs are based. For instance, the one or more background images may be entirely new surrounding environments or scenes, which are not currently part of the dataset. However, in case the background images are captured by vehicles having a different camera arrangement (e.g., position and orientation relative the road) than the vehicles having captured the images of the dataset of images, the distribution of the placement of signs may need to be adjusted based on the different camera arrangements.

In some alternative embodiments, generating S110 the synthetic traffic sign data may comprise placing the 3D model of the traffic sign in one or more background images at a pre-determined position and pre-determined orientation. By the wording "pre-determined" it is herein meant that it is determined prior to placing the 3D model. The pre-determined position and orientation may be set based on a user input. Thus, the 3D model of the traffic sign may be manually placed by a human. In another example, the pre-determined position and orientation may be a position and orientation of an already existing traffic sign. In other words, an already existing traffic sign may be replaced by the 3D model of the detected traffic sign.

The wording "background", as in "background image" should, in contrast to synthetic images, be understood as images of the real-world, as captured by, e.g., camera equipped vehicles. The background images thus serve as a background scene in which the 3D model of the traffic sign can be placed, to form the synthetic data. The background images may be void of any real-world traffic signs, thereby allowing free placement of the 3D model of the traffic sign. Alternatively, the background images may depict one or more real-world traffic signs, which may be replaced by the generated 3D model of the traffic sign. In yet another example, the background images may depict one or more real-world traffic signs, and the 3D model of the traffic sign may be placed in the background images as an addition to the already existing real-world traffic signs. Thus, the background images may be any image captured by on-board sensors of a vehicle.

As stated above, the 3D model may be placed in a plurality of background images. By placing the 3D model in more than one background image, more than one synthetic image can be generated. Thus, the synthetic data may constitute a plurality of synthetic images. In this way, more than one example of the detected traffic sign may be generated for further improving the training of the traffic sign detection model.

The plurality of background images may depict different surrounding environments of a vehicle to provide a variation in the synthetic data generated of the detected traffic sign. In some embodiments, the plurality of background images may depict generally the same surrounding environment, but at different subsequent time-frames. The placement of the traffic sign (e.g., orientation and distance from the camera) in each frame may then be adjusted slightly to simulate the vehicle moving past the traffic sign. The generated synthetic traffic sign data may then be seen as a synthetic video feed of a traffic sign.

In some embodiments, the plurality of background images may be the same, but the 3D model of the traffic sign is placed at different places in the image (e.g., at varying distances from a camera).

The method 100 may further comprise updating S118 the dataset of images by adding the generated synthetic traffic sign data to the dataset of images used for determining the distribution of placement of traffic signs, or any other existing dataset of traffic sign data. Alternatively, a new data set for training the traffic sign detection model may be formed comprising the generated synthetic traffic sign data.

The wording "real-world" or "real", e.g., as in "real-world image" or "real-world traffic sign" should throughout the present disclosure be understood as referring to objects as seen in, or images depicting the real world as it is, without being modified.

The method 100 may further comprise capturing S102 the sample image depicting the surrounding environment of the vehicle by one or more cameras of the vehicle. In conjunction with capturing S102 the sample image, additional sensor data of the surrounding environment may be collected, such as LIDAR or RADAR data for providing depth information of the surrounding environment.

The method 100 may further comprise detecting S104, by a machine learning model, the traffic sign in the sample image depicting the surrounding environment of the vehicle. In other words, the traffic sign may be detected by inputting the sample image into the machine learning model trained to detect traffic signs in images (e.g., if there is an object within the image that corresponds to a traffic sign or not). By detecting the traffic sign, a bounding box or segmentation of the traffic sign may be obtained. The machine learning model for detecting S104 the traffic sign may be a separate detection model from the traffic sign detection model otherwise referred to herein. Alternatively, the traffic sign may be detected S104 by a detection part of the traffic sign detection model. In such case, the generated synthetic traffic sign data may be used to train a classification part of the traffic sign detection model.

The method 100 may further comprise obtaining S112 a label corresponding to the detected traffic sign. The label may specify what type of sign it is, and thus can serve as a ground truth when training the traffic sign detection model. The label maybe obtained S112 through a user input. Alternatively, in case the traffic sign is already known, the label may be obtained S112 through matching the detected traffic sign to an already labeled instance of the traffic sign. In other words, the label may be obtained as an already existing label belonging to an already labelled traffic sign. The matching can be performed e.g. by a separate machine learning model trained on a few instances if the traffic sign to detect if new instances match. The method 100 may further comprise assigning S114 the label to the generated synthetic traffic sign data. The label may be assigned to each background image onto which the 3D model is placed. The step of obtaining S112 the label and the step of assigning S114 the label may be performed independently of some of the steps of the method 100. For instance, the steps S112 and S114 may be performed at any time after it has been decided to extract S106 the face of the detected traffic sign.

The above-described steps of the method 100 may be performed locally in the vehicle. The method 100 may for instance be executed by a computing device of the vehicle. The method 100 may further comprise transmitting S116 the generated synthetic traffic sign data to a remote server and/or to a further vehicle. The generated synthetic traffic sign data may thus be used in training traffic sign detection models of other vehicles.

The method 100 as described above provides for an improved way of generating synthetic traffic sign data. The principles of the method 100 can be used to generate synthetic data of any traffic sign. However, for the sake of autonomous or semi-autonomous vehicle development, the method 100 may be particularly advantageous when performed for certain traffic signs. In the following, and in connection with FIG. 5, some embodiments of the presently disclosed technology that aims to generate synthetic traffic sign data for traffic signs belonging to a defined traffic sign class, will be described.

In general, this can be seen as a targeted approach of generating synthetic traffic sign data which focuses on those traffic signs that may have a relatively high value for the training of the traffic sign detection model.

In the above-mentioned embodiments, extracting S106 the face of the detected traffic sign may be performed in response to the detected traffic sign being classified as a sign comprised within a defined traffic sign class. In other words, only signs which are classified as belonging to the defined traffic sign class may be extracted and processed further by the method 100.

The defined traffic sign class may for instance be that the traffic sign is a rare traffic sign or an important traffic sign (e.g., from a training perspective). By the wording "rare" it is herein meant that the traffic sign is rare in view of an occurrence in the real-world, or in view of how many examples are present in a present dataset used for training the traffic sign detection model. By the wording "important" it is herein meant in regards to a training perspective. A detected traffic sign may be "important" if it is of value for improving the performance of the traffic sign detection model. As another way of putting it, a traffic sign may be "rare" or "important" if it is determined or classified as being out-of-distribution (OOD) of the traffic sign detection model. The defined traffic sign class may thus be a class of rare traffic signs, or a class of important traffic signs.

It should be appreciated that even though described as "defined traffic sign class", the traffic sign need not to be classified as a specific class, but rather that it is determined in some way that the traffic sign is "rare", "important" or "out-of-distribution", and therefore of greater value for generating synthetic traffic sign data of. In other words, the step of extracting S106 the face of the detected traffic sign may be performed in response to the detected traffic sign having an indication of belonging to a defined traffic sign class.

Determining that the detected traffic sign belongs to the defined traffic sign class may be done in several ways. For example, it can be determined whether the detected traffic sign is OOD of the traffic sign detection model by use of ensemble networks, and checking whether the output of the different ensemble network diverges.

As another example, a low or otherwise indecisive confidence score outputted by the traffic sign detection model for the detected traffic sign may be an indication of that the traffic sign is rare, since it may indicate that the traffic sign detection model may not (or only to a small extent) have seen the detected traffic sign during training.

In yet another example, a separate classification model for classifying the signs as belonging to the defined traffic sign class may be used. The separate classification model may for instance have been trained to identify rare traffic signs by having been trained on a few samples of the rare traffic signs. In such an embodiment, the separate classification model may be continuously fine-tuned as more and more examples of rare traffic signs are found, to improve its performance.

With the proposed method it is possible to shorten the feedback cycle by using an end-to-end approach where, e.g., each rare traffic sign that is detected can be used directly to generate new realistic training data. Each vehicle in a fleet of vehicles (see further below in connection with FIG. 5) may identify rare traffic signs, create more training data on the go, and retrain or fine-tune the traffic sign detection model, as well as share the new updates with the fleet.

Executable instructions for performing these functions are, optionally, included in a non-transitory computer-readable storage medium or other computer program product configured for execution by one or more processors.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

Figure 2:
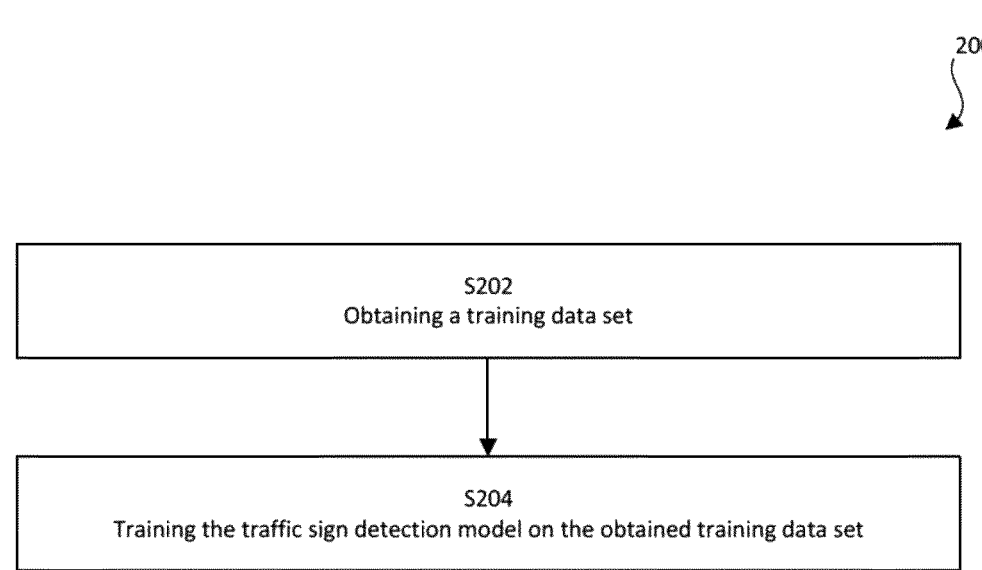
FIG. 2 is a schematic flowchart representation of a method for training a traffic sign detection model in accordance with some embodiments.

FIG. 2 is a schematic flowchart representation of a method 200 for training a traffic sign detection model. In the following, the different steps are described in more detail. The traffic sign detection model should throughout the present disclosure be understood as a machine learning model for detecting and/or classifying traffic signs in images.

The machine learning models (may also be referred to as machine-learning algorithm, neural networks, and so forth) are implemented in some embodiments using publicly available suitable software development machine learning code elements, for example, such as those which are available in Python®, Pytorch®, TensorFlow®, and Keras®, or in any other suitable software development platform, in any manner known to be suitable to someone of ordinary skill in the art.

The wording "training" herein refers to the process of teaching the machine learning model to recognize patterns and relationships in a dataset, or more specifically, to detect/classify/recognize traffic signs in images. The training process may refer to training of a new machine learning model from scratch. However, the process may also refer to re-training of an existing machine learning model or fine-tuning of an existing model.

Re-training of a machine learning model refers to the process of updating an existing model with a new or updated dataset. Re-training the model may involve training the model from scratch, with training data comprising the new data (in this case the generated synthetic data). Alternatively, re-training the model may involve training the already trained model on the new data only. The aim of re-training may be to improve the model's accuracy and generalization ability on new, unseen data, or rare data that the model has not seen as often.

Re-training may also be necessary when the original training data is no longer representative of the real-world data, or when the model's performance has decreased due to changes in the data distribution. Re-training may also be necessary when the model needs to be adapted to a new task or application.

The re-training process involves several steps, similar to an initial training process. The new data is added to the existing dataset, and the model is retrained using the updated data. Depending on the extent of the changes in the data, the model may need to be modified or reconfigured before retraining.

Fine-tuning of a machine learning model refers to the process of training a pre-trained model, already trained for a different task or on different data, on the new data. Fine-tuning may involve training a part of the pre-trained model (e.g., the last few layers), the entire model, or replacing or adding new layers and training only the new layers. The pre-trained model may for instance be a generic machine learning model, which after fine-tuning, is adapted for a new task for a new domain.

The method 200 comprises obtaining S202 a training dataset comprising synthetic traffic sign data generated by the method 100 described above in connection with FIG. 1.

The term "obtaining" is herein to be interpreted broadly and encompasses receiving, retrieving, collecting, acquiring, and so forth directly and/or indirectly between two entities configured to be in communication with each other or further with other external entities. However, in some embodiments, the term "obtaining" is to be construed as determining, deriving, forming, computing, etc. In other words, obtaining a training dataset may encompass determining, computing or generating the training dataset, e.g., by performing the method 100 described in connection with FIG. 1. Alternatively, the training dataset may be received, e.g., from another entity, or from a memory or database where the training dataset is stored. Thus, as used herein, "obtaining" may indicate that a parameter is received at a first entity/unit from a second entity/unit, or that the parameter is determined at the first entity/unit, e.g., based on data received from another entity/unit.

The method 200 further comprises training S204 the traffic sign detection model on the obtained training dataset. Training S204 the traffic sign detection model may be done according to any suitable process as readily understood by the skilled person. For example, the traffic sign detection model may be trained using supervised leaning where each instance of the training dataset has an associated label stating what traffic sign it is.

The step of training S204 the traffic sign detection model may be performed in a server or in a vehicle, as is further described below in connection with FIG. 5.

The method 200 may further comprise transmitting the trained traffic sign detection model to the server, in case it was trained in the vehicle. Alternatively, the method 200 may further comprise transmitting the trained traffic sign detection model to the vehicle, in case it was trained in the server.

Executable instructions for performing these functions are, optionally, included in a non-transitory computer-readable storage medium or other computer program product configured for execution by one or more processors.

Figure 3:
FIG. 3 is a schematic illustration of a device for generating synthetic traffic sign data for training a traffic sign detection model in accordance with some embodiments.

FIG. 3 is a schematic illustration of a device 300 for generating synthetic traffic sign data for training a traffic sign detection model. In particular, the device is configured to perform the techniques described in the foregoing with reference to FIG. 1. The device 300 may be provided locally in a vehicle, such as in the vehicle 400 described below in connection with FIG. 4. More specifically, the device 300 may be an integrated device of an automated driving system, ADS, of the vehicle. Alternatively, the device 300 may be an external device to the ADS and communicatively connected to the ADS. Alternatively, the device 300 may be provided as an external device to the vehicle, such as a remote server, as further described below in connection with FIG. 5. The remote server may be communicatively connected to the vehicle. As is readily understood by the person skilled in the art, the functions of the device 300 may be distributed over one or more devices. For instance, some of the functions of the herein described device 300 may be implemented by a device in the vehicle, and some of the functions may be implemented by the remote server.

The device 300 comprises control circuitry 302. The control circuitry 302 may physically comprise one single circuitry device. Alternatively, the control circuitry 302 may be distributed over several circuitry devices. As an example, the device 300 may share its control circuitry 302 with other parts of the vehicle, in case it is implemented in the vehicle.

As shown in the example of FIG. 3, the device 300 may further comprise a transceiver 306 and a memory 308. The control circuitry 302 being communicatively connected to the transceiver 306 and the memory 308. The control circuitry 302 may comprise a data bus, and the control circuitry 302 may communicate with the transceiver 306 and/or the memory 308 via the data bus.

The control circuitry 302 may be configured to carry out overall control of functions and operations of the device 300. The control circuitry 302 may include a processor 304, such as a central processing unit (CPU), microcontroller, or microprocessor. The processor 304 may be configured to execute program code stored in the memory 308, in order to carry out functions and operations of the device 300. The control circuitry 302 is configured to perform the steps of the method 100 as described above in connection with FIG. 1. The steps may be implemented in one or more functions stored in the memory 308. The control circuitry 302 may be configured to execute a capturing function 310, a detecting function 312, an extracting function 314, a forming function 316, a generating function 318, an obtaining function 320, an assigning function 322, a transmitting function 324 and/or an updating function 326. It should be noted that the various function and operation of the device 300 may be implemented in additional functions than those described herein. In addition, one or more of the above functions may be implemented together in a common function. For example, the obtaining function 320 and the assigning function 322 may be implemented in one common labelling function.

The transceiver 306 is be configured to enable the device 300 to communicate with other devices. The transceiver 306 may both transmit data from and receive data to the device 300. For example, the device 300 may transmit a sample image, or generated synthetic traffic sign data to another entity, as another vehicle or a remote server. Further, the device 300 may receive the sample image from another entity. Even though not explicitly illustrated in FIG. 3, the device 300 may comprise user input devices such as one or more of a keyboard, a mouse, and a touchscreen.

The memory 308 may be a non-transitory computer-readable storage medium. The memory 308 may be one or more of a buffer, a flash memory, a hard drive, a removable media, a volatile memory, a non-volatile memory, a random access memory (RAM), or another suitable device. In a typical arrangement, the memory 308 may include a non-volatile memory for long term data storage and a volatile memory that functions as system memory for the device 300. The memory 308 may exchange data with the circuitry 302 over the data bus. Accompanying control lines and an address bus between the memory 308 and the circuitry 302 also may be present.

Functions and operations of the device 300 may be implemented in the form of executable logic routines (e.g., lines of code, software programs, etc.) that are stored on a non-transitory computer readable recording medium (e.g., the memory 308) of the device 300 and are executed by the circuitry 302 (e.g., using the processor 304). Put differently, when it is stated that the circuitry 302 is configured to execute a specific function, the processor 304 of the circuitry 302 may be configured execute program code portions stored on the memory 308, wherein the stored program code portions correspond to the specific function. Furthermore, the functions and operations of the circuitry 302 may be a stand-alone software application or form a part of a software application that carries out additional tasks related to the circuitry 302. The described functions and operations may be considered a method that the corresponding device is configured to carry out, such as the method 100 discussed above in connection with FIG. 1. Also, while the described functions and operations may be implemented in software, such functionality may as well be carried out via dedicated hardware or firmware, or some combination of one or more of hardware, firmware, and software. In the following, the function and operations of the device 300 is described.

The control circuitry 302 is configured to extract, from a sample image depicting a surrounding environment of a vehicle comprising a detected traffic sign, a face of the detected traffic sign, using information indicative of an orientation of the detected traffic sign. This may be performed e.g. by execution of the extracting function 314. Extracting the face of the detected traffic sign may be performed in response to the detected traffic sign being classified as a sign comprised within a defined traffic sign class. Extracting the face of the detected traffic sign may comprise forming a 2D representation of the detected traffic sign by projecting the detected traffic sign into 2D, based on the information indicative of the orientation.

The control circuitry 302 is further configured to form a 3D model of the traffic sign having the extracted face of the detected traffic sign. This may be performed e.g. by execution of the forming function 316. Forming the 3D model of the traffic sign may comprise extruding the 2D representation of the face of the traffic sign into a 3D representation of the traffic sign.

The control circuitry 302 is further configured to generate synthetic traffic sign data by placing the 3D model of the traffic sign in one or more background images. The 3D model is placed in the one or more background images based on a distribution of a placement of real-world traffic signs in a dataset of real-world images. This may be performed, e.g., by execution of the generating function 318. Placing the 3D model of the traffic sign in one or more background images may comprise determining a position, orientation and size of the 3D model within the one or more background images in which the 3D model is to be placed, based on the distribution of the placement of real-world traffic signs in the dataset of real-world images.

The control circuitry 302 may be further configured to capture the sample image depicting the surrounding environment of the vehicle by one or more cameras of the vehicle. This may be performed e.g. by execution of the capturing function 310.

The control circuitry 302 may be further configured to detect, by a machine learning model, the traffic sign in the sample image depicting the surrounding environment of the vehicle. This may be performed e.g. by execution of the detecting function 312.

The control circuitry 302 may be further configured to update the dataset of images by adding the generated synthetic traffic sign data to the dataset of images. This may be performed e.g. by execution of the updating function 326.

The control circuitry 302 may be further configured to obtain a label corresponding to the detected traffic sign. This may be performed e.g. by execution of the obtaining function 320.

The control circuitry 302 may be further configured to assign the label to the generated synthetic traffic sign data. This may be performed e.g. by execution of the assigning function 322.

The control circuitry 302 may be further configured to transmit the generated synthetic traffic sign data to a remote server and/or to a further vehicle. This may be performed e.g. by execution of the transmitting function 324.

It should be noted that the principles, features, aspects, and advantages of the method 100 as described above in connection with FIG. 1, are applicable also to the device 300 as described herein. In order to avoid undue repetition, reference is made to the above.

The device 300 may be further configured to perform the steps of the method 200 for training a traffic sign detection model, as described above in connection with FIG. 2. Alternatively, a further device may be provided in accordance with the present inventive concept for performing the method 200. The further device may have the same configurations as the device 300 as described above.

The further device (or the device 300 described above) may be configured to obtain a training dataset comprising synthetic traffic sign data generated by the method 100 described above. The further device (or the device 300 described above) may be further configured to train the traffic sign detection model on the obtained training dataset.

Figure 4:
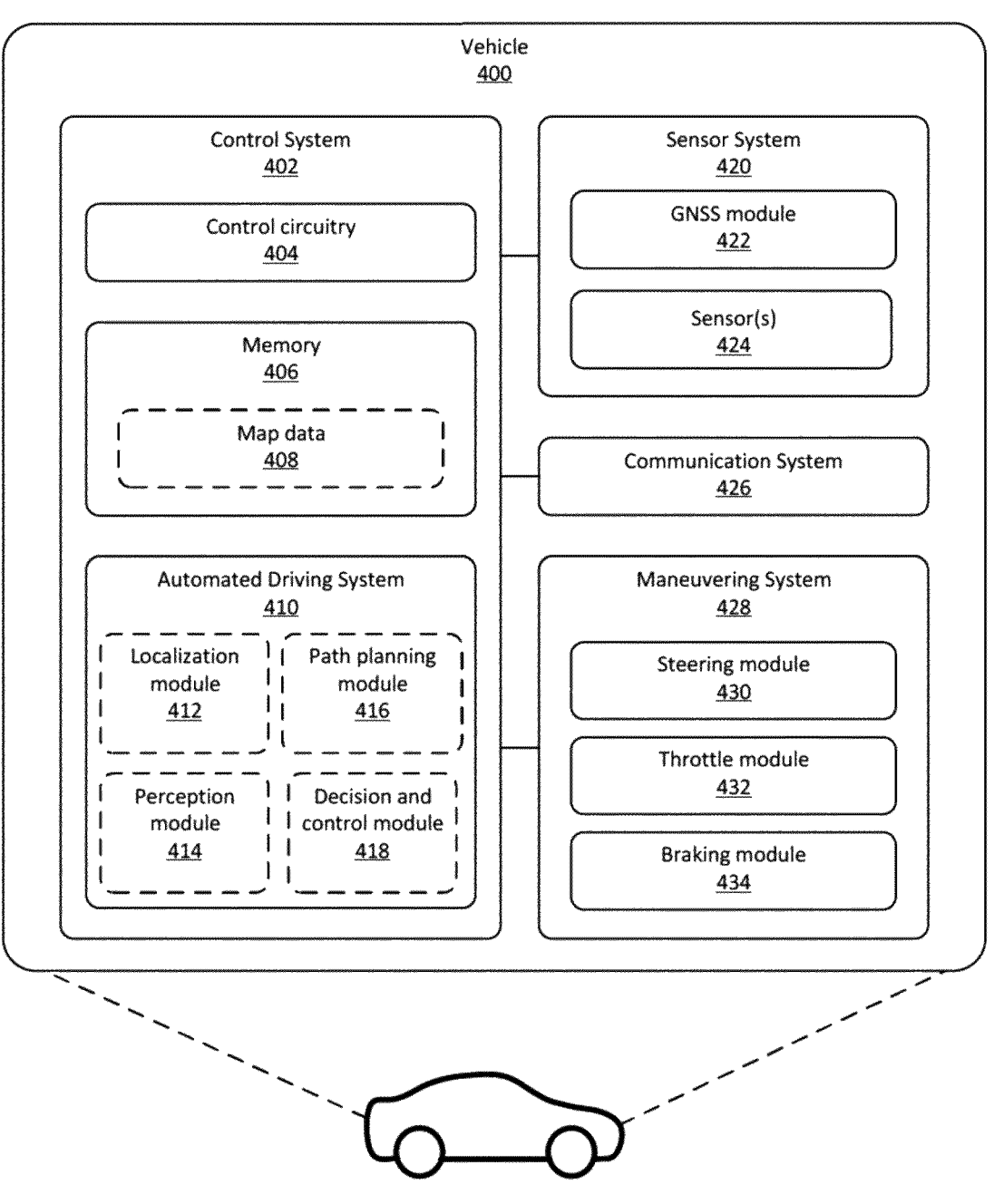
FIG. 4 is a schematic illustration of a vehicle in accordance with some embodiments.

FIG. 4 is a schematic illustration of an example of a vehicle 400 in accordance with some embodiments. The vehicle 400 is equipped with an Automated Driving system (ADS) 410. As used herein, a "vehicle" is any form of motorized transport. For example, the vehicle 400 may be any road vehicle such as a car (as illustrated herein), a motorcycle, a (cargo) truck, a bus, a smart bicycle, etc.

The vehicle 400 comprises a number of elements which can be commonly found in autonomous or semi-autonomous vehicles. It will be understood that the vehicle 400 can have any combination of the various elements shown in FIG. 4. Moreover, the vehicle 400 may comprise further elements than those shown in FIG. 4. While the various elements is herein shown as located inside the vehicle 400, one or more of the elements can be located externally to the vehicle 400. Further, even though the various elements are herein depicted in a certain arrangement, the various elements may also be implemented in different arrangements, as readily understood by the skilled person. It should be further noted that the various elements may be communicatively connected to each other in any suitable way. The vehicle 400 of FIG. 4 should be seen merely as an illustrative example, as the elements of the vehicle 400 can be realized in several different ways.

The vehicle 400 comprises a control system 402. The control system 402 is configured to carry out overall control of functions and operations of the vehicle 400. The control system 402 comprises control circuitry 404 and a memory 406. The control circuitry 402 may physically comprise one single circuitry device. Alternatively, the control circuitry 402 may be distributed over several circuitry devices. As an example, the control system 402 may share its control circuitry 404 with other parts of the vehicle. The control circuitry 402 may comprise one or more processors, such as a central processing unit (CPU), microcontroller, or microprocessor. The one or more processors may be configured to execute program code stored in the memory 406, in order to carry out functions and operations of the vehicle 400. The processor(s) may be or include any number of hardware components for conducting data or signal processing or for executing computer code stored in the memory 406. In some embodiments, the control circuitry 404, or some functions thereof, may be implemented on one or more so-called system-on-a-chips (SoC). As an example, the ADS 410 may be implemented on a SoC. The memory 406 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The memory 406 may include database components, object code components, script components, or any other type of information structure for supporting the various activities of the present description.

In the illustrated example, the memory 406 further stores map data 408. The map data 408 may for instance be used by the ADS 410 of the vehicle 400 in order to perform autonomous functions of the vehicle 400. The map data 408 may comprise high-definition (HD) map data. It is contemplated that the memory 408, even though illustrated as a separate element from the ADS 410, may be provided as an integral element of the ADS 410. In other words, according to an exemplary embodiment, any distributed or local memory device may be utilized in the realization of the present inventive concept. Similarly, the control circuitry 404 may be distributed e.g. such that one or more processors of the control circuitry 404 is provided as integral elements of the ADS 410 or any other system of the vehicle 400. In other words, according to an exemplary embodiment, any distributed or local control circuitry device may be utilized in the realization of the present inventive concept.

The vehicle 400 further comprises a sensor system 420. The sensor system 420 is configured to acquire sensory data about the vehicle itself, or of its surroundings. The sensor system 420 may for example comprise a Global Navigation Satellite System (GNSS) module 422 (such as a GPS) configured to collect geographical position data of the vehicle 400. The sensor system 420 may further comprise one or more sensors 424. The one or more sensor(s) 424 may be any type of on-board sensors, such as cameras, LIDARs and RADARs, ultrasonic sensors, gyroscopes, accelerometers, odometers etc. It should be appreciated that the sensor system 420 may also provide the possibility to acquire sensory data directly or via dedicated sensor control circuitry in the vehicle 400.

The vehicle 400 further comprises a communication system 426. The communication system 426 is configured to communicate with external units, such as other vehicles (i.e. via vehicle-to-vehicle (V2V) communication protocols), remote servers (e.g. cloud servers, as explained further below in connection with FIG. 5), databases or other external devices, i.e. vehicle-to-infrastructure (V2I) or vehicle-to-everything (V2X) communication protocols. The communication system 426 may communicate using one or more communication technologies. The communication system 426 may comprise one or more antennas. Cellular communication technologies may be used for long range communication such as to remote servers or cloud computing systems. In addition, if the cellular communication technology used has low latency, it may also be used for V2V, V2I or V2X communication. Examples of cellular radio technologies are GSM, GPRS, EDGE, LTE, 5G, 5G NR, and so on, also including future cellular solutions. However, in some solutions mid to short range communication technologies may be used such as Wireless Local Area (LAN), e.g., IEEE 802.11 based solutions, for communicating with other vehicles in the vicinity of the vehicle 400 or with local infrastructure elements. ETSI is working on cellular standards for vehicle communication and for instance 5G is considered as a suitable solution due to the low latency and efficient handling of high bandwidths and communication channels.

The communication system 426 may further provide the possibility to send output to a remote location (e.g., remote operator or control center) by means of the one or more antennas. Moreover, the communication system 426 may be further configured to allow the various elements of the vehicle 400 to communicate with each other. As an example, the communication system may provide a local network setup, such as CAN bus, I2C, Ethernet, optical fibers, and so on. Local communication within the vehicle may also be of a wireless type with protocols such as Wi-Fi®, LoRa®, Zigbee®, Bluetooth®, or similar mid/short range technologies.

The vehicle 400 further comprises a maneuvering system 420. The maneuvering system 428 is configured to control the maneuvering of the vehicle 400. The maneuvering system 428 comprises a steering module 430 configured to control the heading of the vehicle 400. The maneuvering system 428 further comprises a throttle module 432 configured to control actuation of the throttle of the vehicle 400. The maneuvering system 428 further comprises a braking module 434 configured to control actuation of the brakes of the vehicle 400. The various modules of the steering system 428 may receive manual input from a driver of the vehicle 400 (i.e., from a steering wheel, a gas pedal and a brake pedal respectively). However, the maneuvering system 428 may be communicatively connected to the ADS 410 of the vehicle, to receive instructions on how the various modules should act. Thus, the ADS 410 can control the maneuvering of the vehicle 400.

As stated above, the vehicle 400 comprises an ADS 410. The ADS 410 may be part of the control system 402 of the vehicle. The ADS 410 is configured carry out the functions and operations of the autonomous functions of the vehicle 400. The ADS 410 can comprise a number of modules, where each module is tasked with different functions of the ADS 410.

The ADS 410 may comprise a localization module 412 or localization block/system. The localization module 412 is configured to determine and/or monitor a geographical position and heading of the vehicle 400, and may utilize data from the sensor system 420, such as data from the GNSS module 422. Alternatively, or in combination, the localization module 412 may utilize data from the one or more sensors 424. The localization system may alternatively be realized as a Real Time Kinematics (RTK) GPS in order to improve accuracy.

The ADS 410 may further comprise a perception module 414 or perception block/system. The perception module 414 may refer to any commonly known module and/or functionality, e.g., comprised in one or more electronic control modules and/or nodes of the vehicle 400, adapted and/or configured to interpret sensory data-relevant for driving of the vehicle 400—to identify, e.g., obstacles, vehicle lanes, relevant signage, appropriate navigation paths etc. The perception module 414 may thus be adapted to rely on and obtain inputs from multiple data sources, such as automotive imaging, image processing, computer vision, and/or in-car networking, etc., in combination with sensory data, e.g., from the sensor system 420. A traffic sign detection (or recognition) model for detecting and classifying traffic signs in the surrounding environment of the vehicle 400 may be part of the ADS 410, or more specifically part of the perception module 414. The vehicle 400 is configured to perform the functions of the method 100 for generating synthetic traffic sign data. This may be achieved by the vehicle 400 comprising a device 300 for generating synthetic traffic sign data as described above in connection with FIG. 3. The device 300 may be provided as an integral part of the perception module 414. Alternatively, the device 300 may be distributed over several modules or elements of the vehicle 400, as readily understood by the person skilled in the art.

The localization module 412 and/or the perception module 414 may be communicatively connected to the sensor system 420 in order to receive sensory data from the sensor system 420. The localization module 412 and/or the perception module 414 may further transmit control instructions to the sensor system 420.

The ADS may further comprise a path planning module 416. The path planning module 416 is configured to determine a planned path of the vehicle 400 based on a perception and location of the vehicle as determined by the perception module 414 and the localization module 412 respectively. A planned path determined by the path planning module 416 may be sent to the maneuvering system 428 for execution.

The ADS may further comprise a decision and control module 418. The decision and control module 418 is configured to perform the control and make decisions of the ADS 410. For example, the decision and control module 418 may decide on whether the planned path determined by the path-planning module 416 should be executed or not.

It should be understood that parts of the described solution may be implemented either in the vehicle 400, in a system located external the vehicle, or in a combination of internal and external the vehicle; for instance, in a server in communication with the vehicle, a so-called cloud solution. The different features and steps of the embodiments may be combined in other combinations than those described. Further, the elements of the vehicle 400 (i.e., the systems and modules) may be implemented in different combinations than those described herein.

Figure 5:
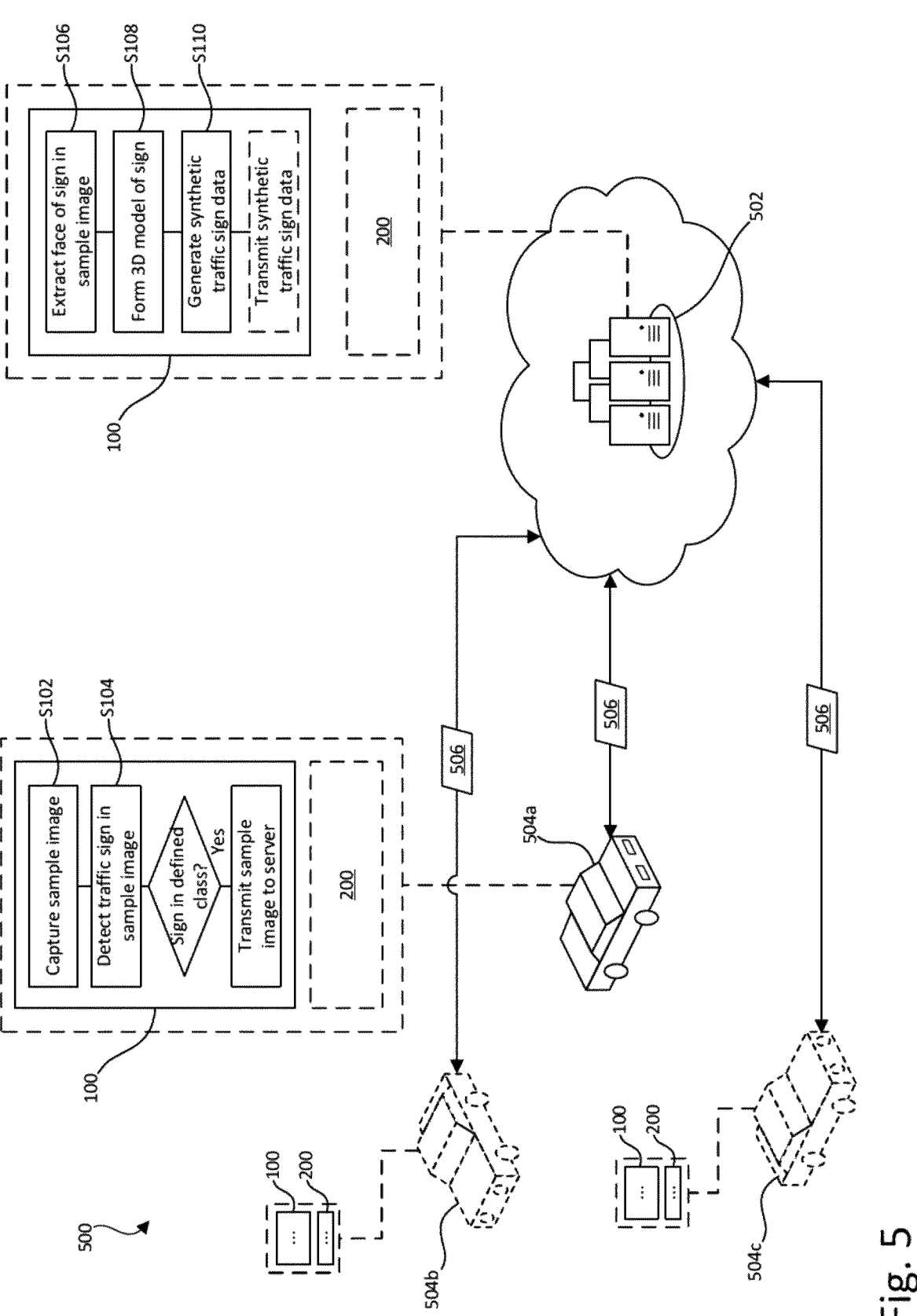
FIG. 5 is a schematic illustration of a distributed system for generating synthetic traffic sign data in accordance with some embodiments.

FIG. 5 shows an example embodiment of a distributed system 500 for generating synthetic traffic sign data and/or for training a traffic sign detection model. The system 500 may be seen as a non-limiting example realization of the herein disclosed aspects of the present inventive concept. For instance, the system 500 is configured to perform the method 100 for generating synthetic traffic sign data as described above in connection with FIG. 1. The system 500 may be further configured to perform the method 200 for training a traffic sign detection model, as described above in connection with FIG. 2. Thus, any features or principles described above in connection with FIGS. 1 to 4 are applicable also to the system 500 as described herein, unless otherwise stated.

The system 500 comprises a remote, central, back-office, fleet or back-end server 502, referred to in the following as the remote server 502 or just server 502. As illustrated, the remote server 502 may be provided in the cloud, i.e., as a cloud-implemented server. The system 500 further comprises one or more vehicles 504a-c, also referred to as a fleet of vehicles 504a-c. The one or more vehicles 504a-c may be vehicles as the vehicle 400 described above in connection with FIG. 4. The one or more vehicles 504a-c are communicatively connected to the remote server 502 for transmitting and receiving data 506 there between. The communication may be performed by any suitable wireless communication protocol. The wireless communication protocol may, e.g., be long range communication protocols, such as cellular communication technologies (e.g. GSM, GPRS, EDGE, LTE, 5G, 5G NR, etc.) or short to mid-ranged communication protocols, such as Wireless Local Area (LAN) (e.g., IEEE 802.11) based solutions. The sever 502 comprises a suitable memory and control circuitry, for example, one or more processors or processing circuitry, as well as one or more other components such as a data interface and transceiver. The server 502 may also include software modules or other components, such that the control circuitry can be configured to execute machine-readable instructions loaded from memory to implement the steps of the method to be performed.

The fleet illustrated in FIG. 5 comprise three vehicles 504a-c by way of example only. The system 500 may comprise any number of vehicles 504a-c. However, the system 500 will in the following be described with reference to one of the vehicles, denoted 504a. It goes without saying that the principles apply also to the other vehicles, of the fleet of vehicles 504a-c.

In the present example embodiment, the vehicle 504a (or, in other words, a computing device or control circuitry thereof) is configured to perform the capturing step S102, as explained above, to capture the sample image. The sample image may be captured by one or more on-board cameras of the vehicle 504a. Thus, the sample image depicts a surrounding environment of the vehicle 504a. The sample image may be captured continuously, or at a defined time interval, as the vehicle 504a drives along a road. Thus, the method 100 may be performed iteratively, so as to capture any traffic signs of interest.

The vehicle 504a is further configured to perform the detection step S104, as further explained in the foregoing. Thus, the vehicle 504a is configured to detect the sample image, whether or not a traffic sign is present (i.e., depicted) in the sample image. Detecting the traffic sign may be performed by a machine learning model.

The vehicle 504a may further be configured to, in response to detecting a traffic sign in the sample image, determine whether the detected traffic sign belongs to a defined traffic sign class. Put differently, the vehicle 504a may classify the detected traffic sign. If the detected traffic sign is found to be of interest, e.g. by belonging to a certain defined traffic sign class, the vehicle 504a may transmit the sample image of the detected traffic sign to the remote server 502 for further processing.

In response to receiving the sample image from the vehicle 504a, the remote server 502 performs the step of extracting S106 the face of the traffic sign in the sample image. The remote server 502 is further configured to perform the step of forming S108 the 3D model of the traffic sign, having the extracted face. The remote server 502 is further configured to generate S110 the synthetic traffic sign data by placing the 3D model of the traffic sign in one or more background images, based on a distribution of a placement of real-world traffic signs in images of a dataset of real-world images. The dataset of images may be stored in the remote server 502. The dataset of images may comprise images captured by the vehicles 504a-c of the system 500 and depict surrounding environments of the vehicles 504a-c comprising traffic signs.

After having generated new synthetic traffic sign data, the stored dataset of images may be updated by adding the generated traffic sign data to the dataset. Alternatively, or in combination, the server 502 may transmit the generated synthetic traffic sign data (and/or the updated dataset) to one or more of the vehicles of the fleet of vehicles 504*a-c*, e.g., for training traffic sign detection models of the vehicles.

In some embodiments, the steps of obtaining S112 a label corresponding to the detected traffic sign, and assigning S114 the label to the generated synthetic traffic sign data are performed by the server 502. The label may be obtained, e.g., from the defined traffic sign class which the traffic sign belongs to. In case the traffic sign of which the synthetic traffic sign data is generated is a new, i.e., not previously seen, traffic sign, the label may be obtained from a user input from a person tasked with labelling images of traffic signs. It is however to be appreciated that the obtaining S112 and assigning S114 steps may also be implemented in the vehicle 504*a*.

The illustrated system as described above provides for an efficient way of collecting images of, e.g., new, rare or important traffic signs and for generating synthetic traffic sign data thereof. The system is efficient in terms of time, since a fleet of multiple vehicles is utilized to collect and transmit sample images of traffic signs. This may increase the amount of signs that can be detected, in a certain time period.

The system 500 may be further efficient in terms of data management (e.g., transmission and storage), since only the traffic signs of relevance (e.g. those that belong to a defined traffic sign class), may need to be processed. The present distribution of the steps of the method 100 between the server 502 and the vehicles 504*a-c* is further efficient in terms of computational resources. One reason for this may be that as many computational steps as possible can be performed by the server 502, thereby requiring a reduced amount of the computational resources of the vehicles 504*a-c*. However, it should be noted that the system 500 is only described by way of example. Those of ordinary skill in the art appreciate that modifications of the system 500 may be done depending on the specific realization. For instance, some steps may be performed either by the vehicle 504*a* or by the server 502. In some embodiments, for example, the vehicle 504*a* performs all steps of the method 100, e.g., by a device 300 as described above in connection with FIG. 3. The vehicle 504*a* may then transmit the synthetic traffic sign data to the server 502. The server 502 may then distribute the synthetic traffic sign data to other vehicles of the fleet of vehicles. In yet another example, the vehicle 504*a* may perform the steps up to and including extracting the face of the sign in the sample image of which synthetic traffic sign data is to be generated, and then transmit the face of the sign to the server 502. The server 502 may then perform the remaining steps of the method 100. In yet another example, the vehicle 504*a* may perform the steps up to and including forming of the 3D model of the sign. The vehicle 504*a* may then transmit the 3D model to the server 502, which then generates the synthetic traffic sign data.

As stated above, the system 500 may be further configured to perform the method 200 for training a traffic sign detection model. Training of the traffic sign detection model may be performed by so-called federated leaning.

Federated learning is a scheme where a "global" or "central" model is consolidated from "local" models trained at the edge. This is prevalent in "voice assistants" and "typing models" for, e.g., smart phones. In the present context, the vehicles constitute the edge devices or nodes, while the remote server (or a plurality of remote servers) may constitute the central server responsible for aggregating or consolidating the model updates from each of the edge devices. This would be referred to as centralized federated learning scheme. However, in some embodiments the need for a central entity may be omitted and the edge devices (e.g., a fleet of vehicles) may be configured to coordinate themselves to obtain the global model, as so called decentralized federated learning scheme. In the following the description is mainly given in reference to a centralized federated learning scheme. It is however presumed that those skilled in the art would readily appreciate how to implement the teachings herein to a decentralized federated learning scheme, and that the scope conveyed by the invention disclosed herein encompasses such a realization. It should be noted that the term "global" does not necessarily imply "worldwide", in the present context, but should instead be construed as something that is "shared" among a plurality of "local" entities.

In the present example, training (or re-training) S204 the traffic sign detection model on a training dataset comprising synthetic traffic sign data generated by the method 100, may be performed in the vehicle 504*a*. The training dataset may be obtained from the remote server 502 and generated from sample images captured by the vehicle itself or other vehicles of the fleet of vehicles. Optionally, the vehicle 504*a* transmits the trained (or re-trained) traffic sign detection model to the remote server 502. The remote server 502 may in turn distribute the trained traffic sign detection model to other vehicles of the system. Alternatively, the remote server 502 may form an aggregated traffic sign detection model from two or more traffic sign detection models, which is then distributed.

Alternatively, the training S204 of the traffic sign detection model may be performed by the remote server 502. The remote server 502 may receive synthetic traffic sign data from the vehicle 504*a*, or generate the synthetic traffic sign data itself, as explained above. The server 502 may then distribute the trained traffic sign detection model to the one or more vehicles 504*a-c* of the system 500.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

It should be noted that any reference signs do not limit the scope of the claims, that the invention may be at least in part implemented by means of both hardware and software, and that the same item of hardware may represent several "means" or "units".

The invention claimed is:

1. A computer-implemented method for generating synthetic traffic sign data for training a traffic sign detection model, the method comprises:

extracting, from a sample image depicting a surrounding environment of a vehicle comprising a detected traffic sign, a face of the detected traffic sign, using information indicative of an orientation of the detected traffic sign;

forming a 3D model of the traffic sign having the extracted face of the detected traffic sign; and generating synthetic traffic sign data by placing the 3D model of the traffic sign in one or more background images, wherein the 3D model is placed in the one or more background images based on a distribution of a placement of real-world traffic signs in a dataset of real-world images.

2. The method according to claim 1, further comprising capturing the sample image depicting the surrounding environment of the vehicle by one or more cameras of the vehicle.

3. The method according to claim 1, further comprising detecting, by a machine learning model, the traffic sign in the sample image depicting the surrounding environment of the vehicle.

4. The method according to claim 1, further comprising updating the dataset of images by adding the generated synthetic traffic sign data to the dataset of images.

5. The method according to claim 1, wherein the step of extracting the face of the detected traffic sign is performed in response to the detected traffic sign being classified as a sign comprised within a defined traffic sign class.

6. The method according to claim 1, wherein the step of extracting the face of the detected traffic sign comprises forming a 2D representation of the detected traffic sign by projecting the detected traffic sign into 2D, based on the information indicative of the orientation, and wherein the step of forming the 3D model of the traffic sign comprises extruding the 2D representation of the face of the traffic sign into a 3D representation of the traffic sign.

7. The method according to claim 1, wherein placing the 3D model of the traffic sign in one or more background images comprises determining a position, orientation and size of the 3D model within the one or more background images in which the 3D model is to be placed, based on the distribution of the placement of real-world traffic signs in the dataset of real-world images.

8. The method according to claim 1, further comprising:

obtaining a label corresponding to the detected traffic sign, and assigning the label to the generated synthetic traffic sign data.

9. The method according to claim 1, wherein the steps of the method are performed locally in the vehicle, and wherein the method further comprises:

transmitting the generated synthetic traffic sign data to a remote server and/or to a further vehicle.

10. A non-transitory computer readable storage medium storing instructions which, when executed by a computing device, causes the computing device to carry out the method according to claim 1.

11. A method for training a traffic sign detection model, the method comprising:

obtaining a training dataset comprising synthetic traffic sign data generated by the method according to claim 1;

training the traffic sign detection model on the obtained training dataset, and wherein the step of training the traffic sign detection model is performed in a server, or in a vehicle.

12. A device for generating synthetic traffic sign data for training a traffic sign detection model, the device comprising control circuitry configured to:

extract, from a sample image depicting a surrounding environment of a vehicle comprising a detected traffic sign, a face of the detected traffic sign, using information indicative of an orientation of the detected traffic sign;

form a 3D model of the traffic sign having the extracted face of the detected traffic sign; and generate synthetic traffic sign data by placing the 3D model of the traffic sign in one or more background images, wherein the 3D model is placed in the one or more background images based on a distribution of a placement of real-world traffic signs in a dataset of real-world images.

13. The device according to claim 12, wherein the control circuitry is configured to extract the face of the detected traffic sign in response to the detected traffic sign being classified as a sign comprised within a defined traffic sign class.

14. The device according to claim 12, wherein extracting the face of the detected traffic sign comprises forming a 2D representation of the detected traffic sign by projecting the detected traffic sign into 2D, based on the information indicative of the orientation, and wherein forming the 3D model of the traffic sign comprises extruding the 2D representation of the face of the traffic sign into a 3D representation of the traffic sign.

15. A vehicle comprising:

one or more sensors, and a device for generating synthetic traffic sign data for training a traffic sign detection model, according to claim 12.

* * * * *